Dec. 13, 1949  L. A. HAYOT  2,491,042
FLYING MACHINE, INCLUDING FEATURES
OF A HELICOPTER AND AN AUTOGIRO
Filed Nov. 7, 1946  3 Sheets-Sheet 1
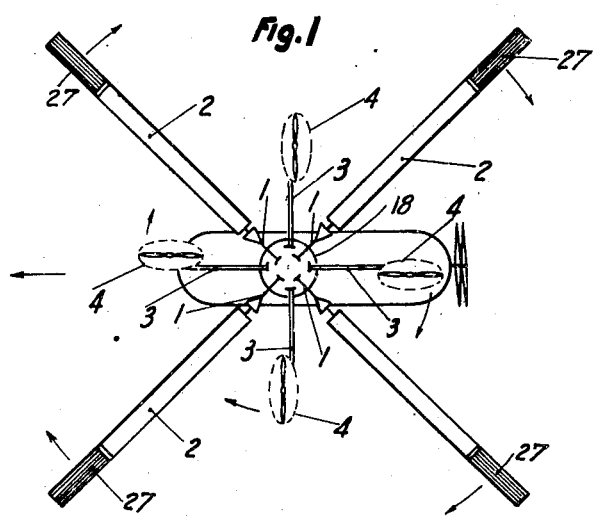
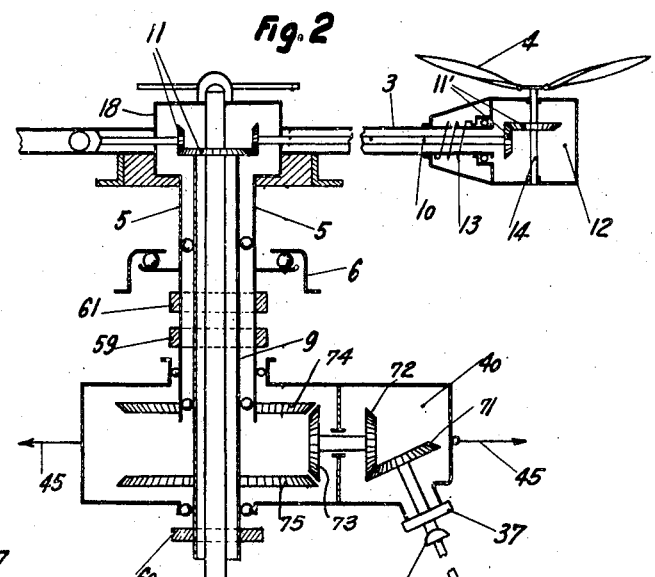
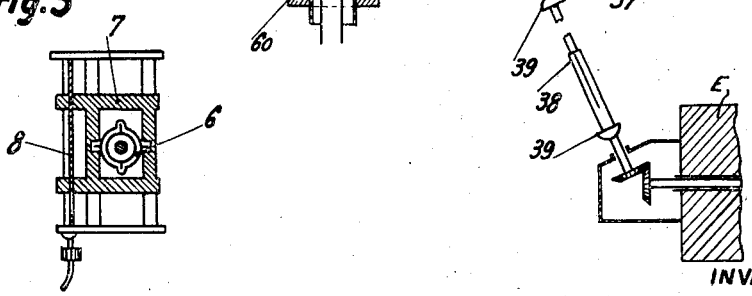
INVENTOR
LOUIS ADOLPHE HAYOT
BY
*Richards & Geier*
ATTORNEYS

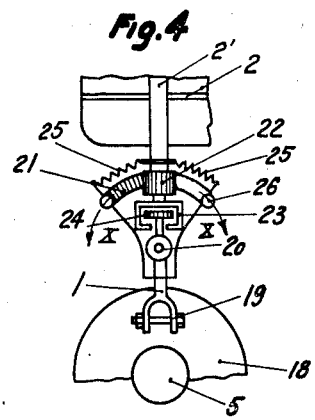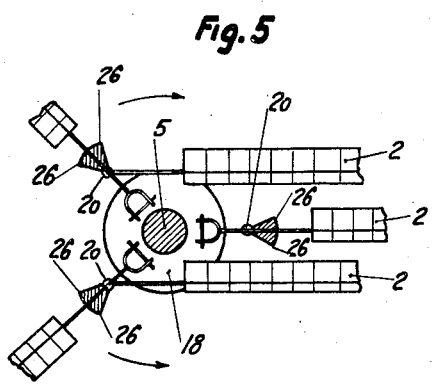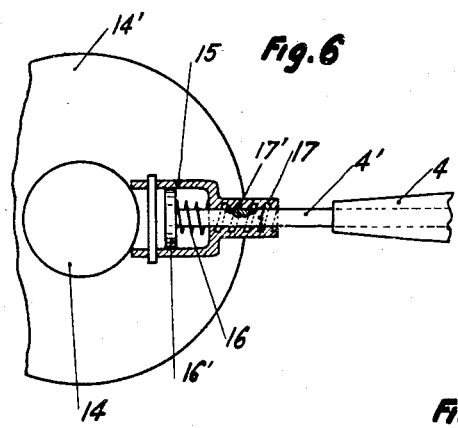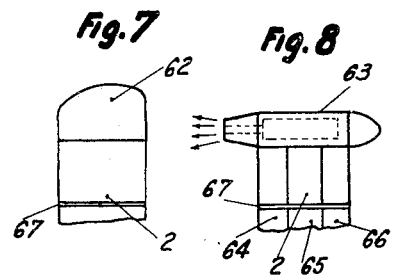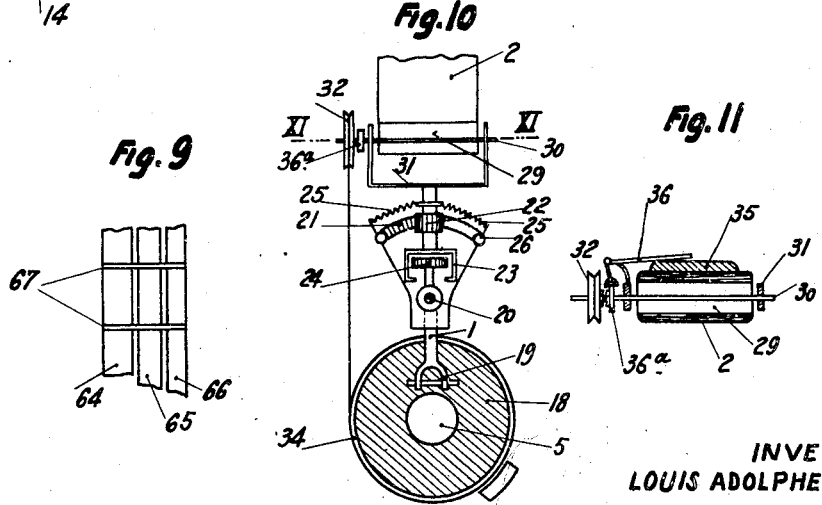

Dec. 13, 1949 L. A. HAYOT 2,491,042
FLYING MACHINE, INCLUDING FEATURES
OF A HELICOPTER AND AN AUTOGIRO
Filed Nov. 7, 1946 3 Sheets-Sheet 3
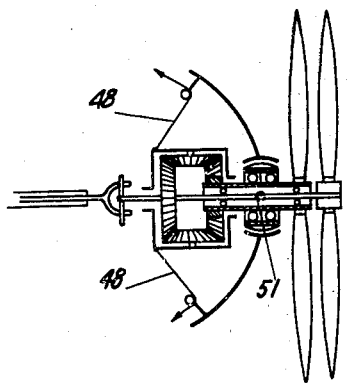
Fig. 12
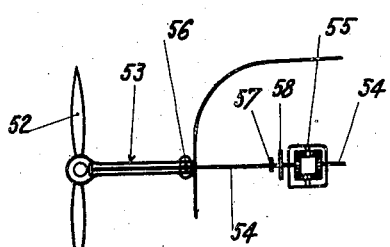
Fig. 13
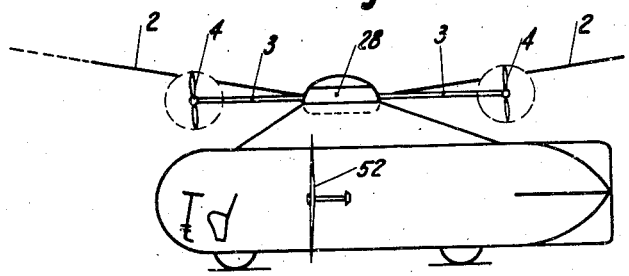
Fig. 14
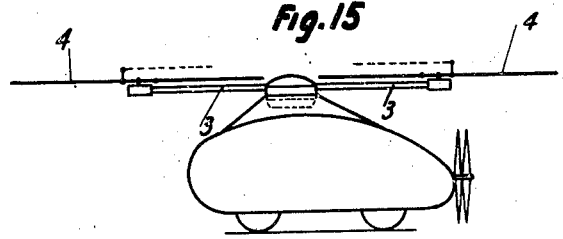
Fig. 15
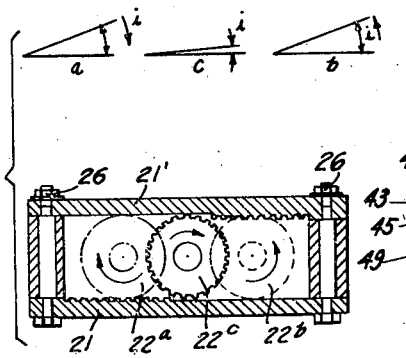
Fig. 4a
Fig. 16
INVENTOR
LOUIS ADOLPHE HAYOT
BY
Richards&Geier
ATTORNEYS Patented Dec. 13, 1949

2,491,042

UNITED STATES PATENT OFFICE 2,491,042

FLYING MACHINE, INCLUDING FEATURES OF A HELICOPTER AND AN AUTOGIRO

Louis Adolphe Hayot, Paris, France

Application November 7, 1946, Serial No. 708,220
In France December 24, 1945

6 Claims. (Cl. 170—135.21)

The present invention has for its object a flying machine including the features of a helicopter and an Autogiro. It is principally characterized by the novel conception of its rotating supporting surface and by its combined device for pilotage during the flight and steering on the ground.

The accompanying drawings show by way of example several embodiments of the object of the invention.

Figure 1 is a plan view of the rotating supporting surface of a flying machine wherein the supporting blades are ballasted by reaction supporting and propelling members.

Figure 2 is a vertical section through the axis of this machine showing the devices for driving the shaft of the rotating supporting surface and for driving the compensating airscrews and the suspension of the body of the machine.

Figure 3 is a plan view of the device for the longitudinal displacement of the rotating supporting surface with respect to the body.

Figure 4 is a plan view of the articulation device of the supporting blades.

Figure 4a is a sectional view taken along the cylindrical surface indicated by X—X in Figure 4, and showing also the angles of incidence corresponding to different positions of the device.

Figure 5 is a fragmentary plan view showing a three blade supporting surface in folded position.

Figure 6 is a partly sectional detail view of the mounting of one of the blades of a compensating airscrew.

Figures 7 and 8 are detail views of ballasts for flexible supporting blades.

Figure 9 is a fragmentary view of a supporting blade having gaps and stiffening members.

Figure 10 is a plan view of a device for winding up a flexible supporting blade.

Figure 11 is a section taken on line XI—XI of Fig. 10.

Figure 12 is a horizontal section of a propelling and directing device comprising airscrews mounted at the rear of the machine.

Figure 13 is a partial transverse section showing schematically one side of a propelling and directing device comprising lateral airscrews.

Figure 14 is a side view of a flying machine, according to the invention having supporting blades and compensating airscrews with horizontal shafts, the propelling and directing airscrews being mounted on the sides of the machine.

Figure 15 is a side view of a flying machine according to the invention having compensating airscrews with vertical shafts and wherein the airscrews mounted at the rear, which serve for direction only, have a considerably reduced diameter.

Figure 16 is a sectional view of the combined device for the pilotage during flight and steering on the ground.

The rotating supporting surface (Fig. 1) comprises a single rotor the vertical shaft 5 of which can be inclined in all directions and displaced longitudinally with respect to the body of the machine. The shaft 5 is hollow and is rotated by the engine E, through universal joints 39, an extensible shaft 38, a clutch 37 and gears 71, 72, 73, and 74. The rotor hub 18 mounted on the shaft 5 is provided with arms 1 carrying supporting blades 2 and with other arms 3 carrying compensating airscrews 4. These airscrews have for their object to compensate the reaction torque of the supporting blades 2 and of the arms 3 carrying the said airscrews. To the hollow shaft 5 of the rotor is suspended the body of the machine by means of a universal suspension 6 mounted in a frame 7 (Fig. 3) which can be displaced longitudinally on the body of the machine by means of an endless screw 8 which may be rotated manually or mechanically. Rotation is transmitted to the shafts 14 of the airscrews 4 by means of shafts 9 and 10 and bevel pinions 11 and 11' mounted in the hollow shaft 5 and in the arms 3 carrying the said airscrews 4. The shaft 9 is rotated by a gear 75 which is keyed on it and meshes with the engine-driven gear 73. In this manner, the rotor is rotated on the one hand directly by the engine E rotating the hollow shaft 5, and on the other hand indirectly by the action of the compensating airscrews 4 the shafts of which can be inclined from 90° to 0° with respect to the shaft of the rotor, so as to compensate exactly the different reaction torques. In the limit case shown in Fig. 14, the compensating airscrews 4 have a diameter which is as small as possible, and their shafts are horizontal, so that they do not contribute in supporting the machine. In the limit case shown in Fig. 15, the compensating airscrews 4 have a diameter which is as large as possible and their shafts are vertical, so that these airscrews contribute in this case largely in supporting the machine. It may be seen that in this novel conception of a rotating supporting surface comprising a single central rotor carrying compensating airscrews which are more or less inclined, the common angle formed between the shafts of the said airscrews and the shaft of the rotor plays the part of a parameter the variation of which, between 90° and 0°, creates a series of flying machines which are all in accordance with the present invention, although the machines representing the ends of this series are very different in shape.

In any case, the compensating airscrews are characterized by the fact that, as soon as they cease to be driven by the engine, the inclination of their shafts and the direction of their pitch are modified automatically in such manner that they continue to rotate in the same direction, by an effect of auto-rotation, and contribute in the supporting of the machine during the landing. To this effect, the casing 12 (Fig. 2) in which is mounted the shaft 14 of each airscrew 4 is able to rotate about the longitudinal axis of the arm 3, from the position where the shaft 14 is vertical and corresponding to the auto-rotation of the airscrew 4, to a more or less inclined position which must be taken by the shaft 14 while the airscrew 4 is driven by the engine, the latter position being determined by a stop member (not shown) suitably provided on the arm 3. A spring 13 tends to return the casing 12 towards the position of auto-rotation wherein the shaft 14 is vertical, when the engine is at rest. When the engine is started, the thrust of the pinions 11' causes the casing 12 and shaft 14 to turn until they reach the position determined by the said stop member. When the engine is cut out during the flight, the thrust of the pinions 11' ceases and the spring 13 turns the casing 12 back until the shaft 14 assumes again its vertical position of auto-rotation. At the same time, as shown in Fig. 6, the foot 4' of each blade of the airscrews 4 slides axially in a guide member 15 mounted on the hub 14', under the action of a spring 16 which is compressed in normal flight by an abutment 16' on the foot 4', under the action of the centrifugal force of the airscrew blade, but which extends when the airscrew is no more driven and its speed falls to the much lower value of auto-rotation. The foot 4' carries a spigot 17' engaging a helical groove 17 formed in the guide member 15, so that the longitudinal displacements of the foot 4' causes it to rotate about its longitudinal axis and thus modifies the pitch of the airscrew.

The supporting blades 2 may be rigid or flexible. If rigid, they are formed in known manner by a tubular beam, stiffening members and a suitable covering. They are mounted on the hub 18 (Fig. 4) of the rotor by two successive articulations 19 and 20 allowing them to effect vertical as well as horizontal displacements. But the blades 2 are characterized by the fact that they can also effect an angular displacement about their longitudinal beam 2', so as to change their angle of incidence, the direction and the amplitude of this last mentioned angular displacement depending on the angular displacement of the blade 2 about the second articulation 20. This may be obtained, for example, by the following device: two sectors 21 and 21' (Figs. 4 and 4a) which are entirely or partially toothed (the upper sector 21' being withdrawn in Fig. 4 so as to show the device) and having their curvature centered on the articulation 20 are fixed on the arm 1 carrying the blade 2, the toothed portions of the lower sector facing smooth portions of the upper sector, and vice-versa. A pinion 22 is keyed upon the beam 2' of the blade 2 and meshes with one or the other toothed sector 21, 21', according to the position it occupies between them. At the inner end of the beam 2' is mounted a cylinder 23 which is rotatably engaged on a fulcrum member 24 pivoted at 20 to the arm 1; by this device, the angle of incidence $i$ of the blade 2 with respect to its plane of rotation will be varied when the said blade executes an angular displacement about the articulation 20, under the action of its inertia and of aerodynamic forces. Springs 25 tend to maintain the blade 2 in an intermediate position corresponding to the angle of incidence for auto-rotation. In particular, if the engine should fail during flight, the blade 2, which, in normal flight had been held back of the arm 1 by the drag, (with the pinion 22 in the position 22a shown in Fig. 4a); advances by its inertia with respect to said arm 1, so that the pinion 22 automatically assumes the position 22c of Fig. 4a and gives the blade 2 the angle of incidence that is necessary for maintaining its movement by an effect of auto-rotation. The bolts 26 assembling the sectors 21 can be removed, which makes it possible, when the machine is on the ground, to fold the blades 2 backwards, above the rear part of the body, as shown in Fig. 5.

When the blades 2 are flexible, they are constituted in a way similar to the known centrifugal or sling airscrews, that is to say without longitudinal stiffening member, and made of any pliant or flexible material, or of rigid elements which are hinged together, and they are ballasted at their ends by heavy bodies. They are characterized in that the heavy bodies, instead of being purely passive weights such as bars or spheres serving only by their inertia to tension the flexible blades, are active members which have furthermore a supporting and propelling effect. Fig. 7 shows a blade ballast 62 having the shape of the end of a supporting wing and thus constituting a very effective supporting element because of its peripheral position and its great linear speed.

According to Fig. 8, the ballast 63 is a hollow cylindrical body with ogive-shaped ends. One of these ends may be screwed off so as to permit the introduction into the hollow ballast 63 of a cartridge which may be fired off electrically and produces a jet giving the blade 2 an impulsion during the landing, in case of an engine failure. In another embodiment, the ballast may be constituted by special supporting and propelling ailerons 27 (Fig. 1).

The flexible blades 2 are further characterized in that they are retractible, due to the fact that they may be wound up and concealed in the position of rest under a protecting cap 28 (Fig. 14).

According to a further characteristic, this winding up is effected by a device using only the inertia of the rotor, so that its operation is always ensured.

An embodiment of such a device is shown by way of example in Figs. 10 and 11. 29 is a drum the meridians of which may be rectilinear or curved, according to the profile of the flexible blade 2 to be wound up thereon. The drum 29 is mounted on a shaft 30 which is rotatably mounted in a bracket 31 which is connected to the hub 18 of the rotor by a device similar to that which has been described with reference to Fig. 4. The flexible blade 2 is automatically wound up on the drum 29 when the latter is rotated by a pulley 32 mounted on the shaft 30 and connected therewith by a normally engaged claw clutch 36a. A cable 33 passes in the groove of the pulley 32 and has its free end secured to the periphery of a ring 34 rotatably mounted on the hub 18. Normally, this ring rotates with the hub 18 but may be immobilised with respect to the body of the machine by means of a brake (not shown) when the pilot operates the said brake. In this instance, the rotor rotating with respect to the ring 34, the cable 33 is wound up on the latter and causes a rotation of the pulley 32, shaft 30 and drum 29, on which the blade 2 is thus wound up. As soon as the blade is completely wound up, an abutment 35 mounted on its end (Fig. 11) lifts the lever 36 which disengages the claw clutch 36a, thus putting the device out of action. Inversely, when the rotor is rotated, the blades 2 are acted upon by centrifugal forces and unwind automatically, the rotation of the drum 29 being transmitted to the entire device as soon as the abutment 35 leaves the lever, thus permitting the reengagement of the claw clutch 36a. The speed of unwinding is moderated by the above mentioned brake which is released completely only after complete unwinding of the blades.

When the width of the blades 2 is so large that it may cause the formation of air-pockets which are liable to reduce considerably the aerodynamic qualities of the blade acting as a wing, the blades 2 are formed by two or more flat cables or strips 64, 65, 66 (Fig. 8) each of which is sufficiently narrow to avoid formation of air-pockets thereon, and which are placed side by side in contact, so that only negligible leak is possible between their edges. If a pocket tends to form on the surface of the blade and over an area extending over more than one of said strips, the edges of the latter will be slightly separated and the pocket immediately emptied. As shown in Fig. 9, the strips 64, 65, 66 may be slightly spaced apart, leaving intervals between their longitudinal edges, so as to form a wing with one or more gaps, having the known properties of such wings, the high supporting power of which may be used during the landing.

Flat rigid or elastic stiffening members 67, which may be rectilinear or curved, can be provided on the blades, at intervals, in order to maintain the desired profile of the blade throughout its length and, if the blade is formed by two or more strips, in order to hold the latter in contact (Fig. 8) or in regularly spaced relation (Fig. 9).

The power of the engine is transmitted to the compensating airscrews by means of the clutch 37 (Fig. 2) and the extensible shaft 38 provided with universal joints 39. In this manner, the gear casing 40 may be displaced in order to incline the rotor in any desired position without interfering with the drive.

The movements of the flying machine about its three central axes of inertia (longitudinal, transverse and vertical axis) are steered and controlled by the pilot, by means of the device shown in Fig. 16.

The steering column is constituted by a tube 41 on the upper end of which is mounted a steering wheel 42 and at the lower end of which is mounted a sphere 43 movable in a socket, so that the steering column is able to oscillate in all directions. Above said sphere, the column carries a cross member 44 having four arms to the ends of which are connected cables 45 leading over suitable guiding pulleys to the four sides of the casing 40 (Fig. 2) carrying the rotor. The pilot is thus able, by inclining the steering column, to incline the shaft 5 of the rotor forwards, backwards, to the right and to the left and generally in any direction where he desires to steer the machine, as is usual in helicopters. Around a pulley 46, coupled for rotation with the steering column 41 by means of a movable key 47, passes a cable 48 by means of which the flying machine is steered in direction, by rotating the steering wheel 42. To this effect, the ends of the cable 48 are connected to the device shown in Fig. 12, or to that shown in Figure 13, which will be described hereafter.

The sphere 43 is mounted with its socket on the casing 49 of a steering mechanism similar to that of an automobile (for example comprising a screw and a toothed sector) which is adapted to steer the rolling wheels of the flying machine when the latter is on the ground. The steering column 41 can be coupled with said steering mechanism by simply lowering a bar 50 which is movable inside the column 41 until the said bar 50 penetrates into the casing 49 and couples the column 41 with the screw of the steering mechanism, preventing simultaneously the column from any lateral movements about the sphere 43 and allowing it only to be rotated by the steering wheel 42, as if it were the steering column of an automobile. When the bar 50 is lowered, it lowers at the same time the key 47, thus uncoupling the column 41 from the pulley 46, so that the cable 48, which is connected to the devices for direction in flight, remains stationary when the steering wheel is turned for steering the rolling wheels of the machine.

As the flying machine according to this invention is designed to be able to fly also as an Autogiro, it is provided with independent propelling means which serves at the same time for steering in direction. For small flying machines, the propelling and steering means is constituted, as showing in Fig. 12, by two coaxial airscrews rotating in opposite directions and the common axis of which can be displaced in direction, like a rudder, by pivoting about a vertical axis 51 when the pilot turns the steering wheel 42, the transmission being effected by the above mentioned cable 48 passing over the pulley 46 (Fig. 16) and the ends of which are attached to the propelling and steering means as shown in Fig. 12.

In larger flying machines such as areo-buses, wherein the engine is preferably placed near the center of gravity of the machine, the propelling and steering means is constituted, as shown in Fig. 13, by two lateral airscrews 52 mounted each on one side of the machine, on pivotable arms 53 which may be swung flat against the side wall of the machine body when the machine is on the ground. Each of these airscrews 52 is driven by a transverse shaft 54 which receives rotation from the engine by means of a differential gear 55 and is provided with a brake 58, a free-wheel mechanism 57 and a universal articulation 56 coaxial with the pivoting point of the arm 53. The brakes 58 are controlled by the steering wheel 42, by means of the two ends of the aforesaid cable 48 passing over the pulley 46 (Fig. 16). Normally, the two airscrews 52 rotate at the same speed and in opposite directions. But when the pilot by means of the steering wheel 42 and cable 48, actuates one of the brakes 58, the corresponding airscrew 52 will be braked, while the airscrew 52 on the other side of the machine will be accelerated due to the action of the differential gear 55, so that a steering effect is obtained.

In order to enable the pilot to turn the machine when it is flying without advancing, being maintained motionless in the air, the machine is provided with two brakes (not shown) acting one upon the brake drum 59 mounted on the rotor shaft 5, and the other upon the brake drum 60 mounted on the shaft 9 which drives the compensating airscrews.

A third brake (not shown) enables the pilot, in case of a vertical landing with stopped engines, to exert a sudden and short braking action upon a brake drum 61 mounted on the rotor shaft 5, in order to reduce aerodynamically the vertical speed of the machine when it reaches the ground. This braking action automatically increases the angle of incidence of the supporting blades, by the action of their inertia causing a movement of the said blades about their second articulation 20, as herebefore described with reference to Figs. 4 and 4a of the drawings. The inertia carries each blade 2 forwards with respect to its arm 1, so that the pinion 22 moves from the position 22c to the position 22b (Fig. 4a) and the angle of incidence i of the blade is automatically increased.

I claim:

1. A flying machine comprising a fuselage, a vertical shaft rotatably mounted in said fuselage, a rotor hub mounted on said vertical shaft, means for rotating said vertical shaft, arms mounted on said rotor hub, supporting blades mounted on said arms so as to be able to effect angular displacements about a vertical axis with respect to said arms, means for varying the angle of incidence of said supporting blades according to their angular position with respect to said arms, other arms mounted on said rotor hub, compensating airscrews mounted on said other arms, the shafts of said compensating airscrews being perpendicular to said other arms and able to take various angular positions with respect to said rotor by angular displacements of their mounting about the longitudinal axis of said other arms, transmission means for rotating said compensating airscrews, and means for varying the angular position of said compensating airscrews, between a position in which their shafts are parallel to said vertical shaft and a position in which their shafts are perpendicular to said vertical shaft.

2. A flying machine comprising a fuselage, a rotor having a vertical axis of rotation and driving means for rotating said rotor, said rotor comprising arms, supporting blades mounted on said arms, other arms, a casing mounted on the outer end of each of said other arms so as to be able to rotate about the longitudinal axis of said other arm, a transmission shaft mounted in the longitudinal axis of said other arm and extending into said casing, an airscrew shaft mounted in said casing perpendicularly to said transmission shaft, a compensating airscrew mounted on said airscrew shaft, elastic means tending to hold said casing in such a position that said airscrew shaft is parallel to the axis of said rotor, toothed wheels transmitting the rotation of said transmission shaft to said airscrew shaft and tending, by the thrust caused by their working, to turn said casing and thus impart to said airscrew shaft an angular displacement with respect to the axis of said rotor, and a stop member limiting said angular displacement.

3. A flying machine as claimed in claim 2, wherein each of said compensating airscrews comprises an airscrew hub mounted on said airscrew shaft, guide members mounted on said airscrew hub, a blade having its foot mounted so as to be slidable in the direction of its axis in each of said guide members, helical guiding means on each said guide member and each said blade foot and adapted to impart to said blade foot a rotation about its longitudinal axis when said blade foot is displaced in the direction of its longitudinal axis with respect to said guide member, and elastic means tending to hold said blade feet in their position nearest to said airscrew shaft.

4. A flying machine as claimed in claim 1, comprising an articulation with horizontal axis connecting each of said arms to said rotor hub, an articulation with vertical axis connecting said arm to said supporting blade mounted thereon, two sectors having toothed portions and smooth portions mounted on said arm concentrically with said articulation with vertical axis, the toothed portions of one of said sectors facing smooth portions on the other of said sectors and vice versa, said supporting blade being mounted so as to be rotatable about its longitudinal axis, and a pinion connected to said supporting blade, placed between said sectors and meshing with said toothed portions.

5. A flying machine as claimed in claim 1, wherein said supporting blades are made of flexible material and ballasted at their outer ends, comprising transversal stiffening members maintaining the profile of said supporting blades, means using the inertia of said rotor for winding up said supporting blades and a protecting cap adapted to cover said supporting blades when they are wound up.

6. A flying machine as claimed in claim 1, wherein said supporting blades are made of flexible material and ballasted at their outer ends, comprising transversal stiffening members maintaining the profile of said supporting blades, means using the inertia of said rotor for winding up said supporting blades and a protecting cap adapted to cover said supporting blades when they are wound up, said means using the inertia of said rotor comprising a drum for each of said supporting blades and adapted to wind up said supporting blade, a pulley mounted coaxially with said drum, a clutch adapted to connect said pulley to said drum, a ring rotatably mounted on said rotor hub, a brake adapted to immobilise said ring with respect to said fuselage, a cable passing over said pulley and having its end secured to said ring, disengaging means for said clutch, and an abutment member mounted on said supporting blade and adapted to operate said disengaging means when said supporting blade is completely wound up on said drum.

LOUIS ADOLPHE HAYOT.

REFERENCES CITED

The following references are of record in the file of this patent:

UNITED STATES PATENTS

| Number | Name | Date |
|---|---|---|
| 1,687,198 | Fromanek et al. | Oct. 9, 1928 |
| 1,820,946 | Pitcairn | Sept. 1, 1931 |
| 1,897,092 | Weir | Feb. 14, 1933 |
| 1,955,921 | Kusse | Apr. 24, 1934 |
| 1,986,709 | Breguet et al. | Jan. 1, 1935 |
| 2,030,578 | Flettner | Feb. 11, 1936 |
| 2,048,950 | Roepke | July 28, 1936 |
| 2,076,327 | Stackelberg | Apr. 6, 1937 |
| 2,135,073 | Gerhardt et al. | Nov. 1, 1938 |
| 2,172,334 | Theodorsen et al. | Sept. 5, 1939 |
| 2,226,978 | Pescara | Dec. 31, 1940 |
| 2,380,580 | Cierva | July 31, 1945 |